(12) United States Patent
Suzuki

(10) Patent No.: US 8,563,878 B2
(45) Date of Patent: Oct. 22, 2013

(54) GROMMET FOR A MOTOR VEHICLE

(75) Inventor: Takashi Suzuki, Yokkaichi (JP)

(73) Assignee: Sumitomo Wiring Systems, Limited, Mie (JP)

( * ) Notice: Subject to any disclaimer, the term of this patent is extended or adjusted under 35 U.S.C. 154(b) by 0 days.

(21) Appl. No.: 13/529,076

(22) Filed: Jun. 21, 2012

(65) Prior Publication Data

US 2013/0008709 A1 Jan. 10, 2013

(30) Foreign Application Priority Data

Jul. 6, 2011 (JP) .................................. 2011-150424

(51) Int. Cl.
*H02G 3/18* (2006.01)
(52) U.S. Cl.
USPC ......................................................... 174/650
(58) Field of Classification Search
USPC ......................................................... 174/650
See application file for complete search history.

(56) References Cited

U.S. PATENT DOCUMENTS

| | | | |
|---|---|---|---|
| 6,353,185 B1 * | 3/2002 | Sakata | 174/668 |
| 6,822,165 B2 * | 11/2004 | Nishimoto | 174/650 |
| 2001/0020536 A1 * | 9/2001 | Kondoh et al. | 174/65 G |
| 2005/0148212 A1 * | 7/2005 | Ojima et al. | 439/34 |
| 2010/0314158 A1 * | 12/2010 | Suzuki et al. | 174/152 G |

FOREIGN PATENT DOCUMENTS

JP 2009-201204 9/2009

* cited by examiner

*Primary Examiner* — Timothy Thompson
*Assistant Examiner* — Rhadames J Alonzo Miller
(74) *Attorney, Agent, or Firm* — Oliff & Berridge, PLC

(57) ABSTRACT

The grommet disclosed includes a first diameter tubular section that allows a wire harness to pass through, and a second diameter tubular section that is provided on the first diameter tubular section. The first diameter tubular section is provided with an outer tubular section that extends in the axial direction. A projecting end of the outer tubular section is connected to the second diameter tubular section. A vehicle body latch portion is provided on an outer periphery or a resin inner of the second diameter tubular section. A grommet-pushing side of the first diameter tubular section is not secured to a wire harness. A grommet-inserting side of the first diameter tubular section is secured to the wire harness. The turning portion is deformed when the grommet is inserted into a through-hole in a vehicle body panel so that the first diameter tubular section is elongated.

11 Claims, 7 Drawing Sheets

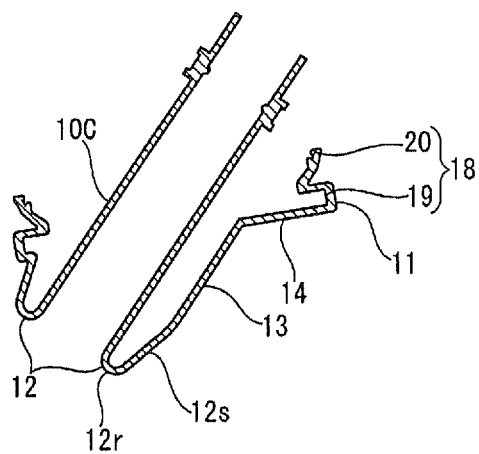
FIG. 8
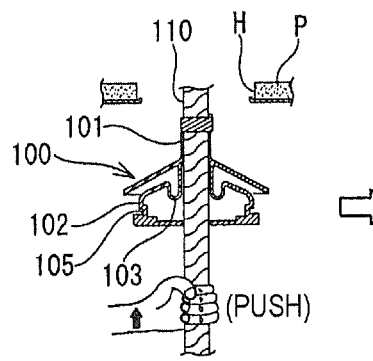
FIG. 9A
PRIOR ART
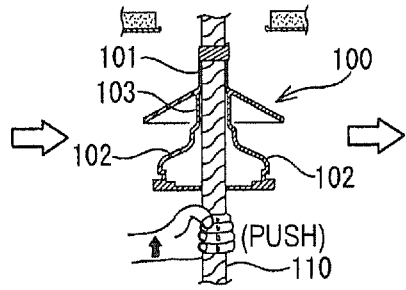
FIG. 9B
PRIOR ART
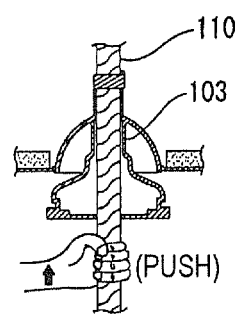
FIG. 9C
PRIOR ART
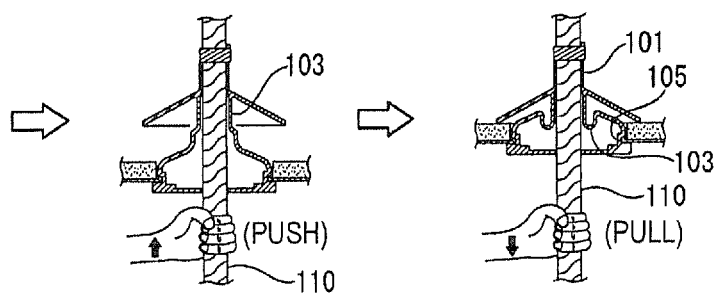
FIG. 9D
PRIOR ART
FIG. 9E
PRIOR ART

GROMMET FOR A MOTOR VEHICLE

This non provisional application claims priority to JP2011-150424 filed Jul. 6, 2011. The disclosed subject matter relates to a grommet, and more particularly relates to a grommet that is mounted on a wire harness to be arranged in a motor vehicle. The grommet is attached to a through-hole in a vehicle body panel to prevent at least water, dust and any unusual noise from entering the inside of the motor vehicle from the outside and to improve the attaching of the grommet to the vehicle body.

BACKGROUND

Grommets for a wire harness are made of a rubber or an elastomer. A grommet includes a smaller diameter tubular section where a group of electrical wires that constitute the wire harness can pass through closely, and a larger diameter tubular section connected to an outer peripheral surface of the smaller diameter tubular section to enlarge a diameter and provided on its outer peripheral surface with an annular vehicle body latch recess. A distal end of a side wall of the vehicle body latch recess is provided with a sealing lip to be pushed onto the vehicle body. Previously, the grommet was temporarily pushed into the inside of the motor vehicle from the outside via a through-hole and then the grommet was pulled outward so that the vehicle body latch recess is engaged with an edge around the through-hole, thereby preventing the sealing lip from being bitten.

However, a relatively great inserting force is required to insert the larger diameter tubular section of the grommet into the through-hole. This lowers workability and productivity.

In order to overcome the above problem, the present applicant proposed a grommet with a larger diameter tubular section that is extendable, as shown in FIGS. 9A to 9E, in JP 2009-201204 A. In JP 2009-201204A, a grommet 100 includes a smaller diameter tubular section 101, a larger diameter tubular section 102, and a U-shaped turning portion 103 between the sections 101 and 102. As shown in FIGS. 9B to 9D, when pushing the grommet 100 into a through-hole H in a vehicle body panel P, a wire harness 110 is pushed inward to extend the turning portion 103 in a straight state, thereby decreasing an inserting force. After a vehicle body latch recess 105 is engaged with an edge around the through-hole H, the wire harness 110 is pulled in a reverse direction to return the turning portion 103 to the original U-shape, as shown in FIG. 9E.

In the grommet having the extendable function disclosed in JP 2009-201204A, extending and deforming the turning portion 103 from a position shown in FIG. 9A to a position shown in FIG. 9B to extend the larger diameter tubular section is carried out so as to extend the entire turning portion 103 in one stroke before inserting the grommet 100 into the through-hole H in the vehicle body panel P. However, it is preferable that the turning portion 103 can extend automatically in response to the inserting work into the through-hole H, without extending the turning portion 103 beforehand. There is also a problem that the turning portion 103 is hard and difficult to extend at the starting time of extension. In particular, there is a problem that extension of the turning portion is difficult if an amount of extension is small.

Recently, in hybrid motor vehicles or electric motor vehicles, there are instances where a smaller diameter tubular section of a grommet is mounted on a pipe harness in which a wire harness to be arranged under a floor of the motor vehicle is inserted into a metal pipe, and the grommet is attached to a through-hole in a floor panel. The smaller diameter tubular section of the grommet is likely to adhere to an outer peripheral surface of the pipe of the pipe harness to be easily displaced in connection with displacement of the pipe. Consequently, the smaller diameter tubular section is likely to pass over a given position before the vehicle body latch recess of the larger diameter tubular section of the grommet is engaged with the through-hole. Accordingly, if the smaller diameter tubular section becomes readily extendable in response to displacement of the pipe, it is possible to enhance workability in insertion of the grommet.

SUMMARY

In view of the above problems, an object of the presently disclosed subject matter is to provide a grommet of which a first diameter tubular section can extend smoothly in response to displacement of a wire harness inserted closely in the first diameter tubular section when the wire harness is pushed into a through-hole in a vehicle body panel.

The presently disclosed subject matter is directed to a grommet that includes a first diameter tubular section that can pass a wire harness in a close contact manner, and a second diameter tubular section, which has a diameter that is larger than the diameter of the first diameter tubular section, provided on an intermediate part on the first diameter tubular section in a longitudinal direction. The first diameter tubular section is provided in an axial direction with an outer tubular section that extends in the axial direction from a turning portion bent outward. A projecting end of the outer tubular section is connected to a closed end of the second diameter tubular section. A vehicle body latch portion is provided on an outer periphery of the second diameter tubular section or on a resin inner that is incorporated with the second diameter tubular section. An end of the first diameter tubular section at a grommet-pushing side, on which the turning portion is provided, and a wire harness are not secured to each other by a tape or a band. The other opposite end of the first diameter tubular section at a grommet-inserting side and the wire harness are secured to each other by a binging band or an adhesive tape. The turning portion is displaced toward the first diameter tubular section in response to displacement of the first diameter tubular section upon inserting the grommet into a through-hole in a vehicle body panel so that the first diameter tubular section is elongated.

As described above, in the grommet, the first diameter tubular section that passes the wire harness in the close contact manner is provided on its end through the turning portion with the outer tubular section, so that the turning portion and outer tubular section become a movable free end condition. The inserting side end of the first diameter tubular section mounted closely on the wire harness moves forward in response to displacement of the wire harness, when the grommet is inserted into and is engaged with the through-hole in the vehicle body panel. However, since the pushing side end of the first diameter tubular section provided with the turning portion is connected through the outer tubular section to the second diameter tubular section and the second diameter tubular section is provided with the vehicle body latch portion, the inserting side end of the first diameter tubular section does not move forward with the pushing side end of the first diameter tubular section by the same amount. In an exemplary embodiment, the turning portion of the first diameter tubular section is under the free condition, and the turning portion can move toward the first diameter tubular section so that the first diameter tubular section can be readily extended. Accordingly, it is possible to enhance an inserting work of the grommet.

Since the first diameter tubular section can extend automatically when the grommet is pushed into the through-hole in the vehicle body panel, it is possible to eliminate a work of extending the extendable portion of the grommet beforehand. Furthermore, if the first diameter tubular section is an inner tube, the outer tube is connected to a bent end of the inner tube to define the turning portion and the turning portion is merely displaced to extend toward the inner tube. Accordingly, it is possible to start extending the inner tube and this will be preferable in the case of a little amount of expansion in dimension.

The turning portion that interconnects a distal end of the first diameter tubular section and the outer tubular section is formed into a U-shaped configuration in cross section. The U-shaped configuration is provided on an outer surface and/or an inner surface of an outer side portion with grooves extending in a width direction of the configuration to define a thin portion so that the outer side portion can readily move toward an inner side portion. Thus, the first diameter tubular section can be readily extended.

Alternatively, a bent portion between a bottom portion of the U-shaped configuration and the outer side portion is formed into a thin thickness so that the turning portion can readily move toward the first diameter tubular section. Thus, the first diameter tubular section can be readily extended. A bent portion between the bottom portion and an inner side portion may be formed into a thin thickness.

Alternatively, the bottom portion of the U-shaped configuration is formed into a small curved portion and the outer side portion is slanted inward so that the outer side portion can readily move toward the inner side portion, in lieu of providing the bottom portion with the thin thickness. Thus, the first diameter tubular section can be readily extended.

The above three alterations may be united.

Preferably, a wire harness that passes the first diameter tubular section of the grommet includes a pipe harness inserted into a metal pipe, the pipe is inserted into the first diameter tubular section in a close contact manner, and a binding band is wound around the inserting side distal end of the first diameter tubular section to secure the distal end to the pipe harness.

As described above, since the grommet for the pipe harness is likely to adhere the first diameter tubular section to the outer peripheral surface of the pipe, it is possible to enhance a work of attaching the grommet for the pipe harness to the through-hole, if the first diameter tubular section is formed into an extendable configuration.

However, the disclosed grommet is not limited to be used for the pipe harness. The disclosed grommet may be applied to a wire harness of which a group of electrical wires are wound roughly by a adhesive tape, a wire harness of which the group of electrical wires is not bundled, or a wire harness that is processed by a waterproofing treatment and is bundled by winding a waterproofing sheet.

The disclosed grommet is used for a pipe harness in which a plurality of electrical wires are inserted into the metal pipe, the electrical wires serve to interconnect a battery for a hybrid motor vehicle or an electric motor vehicle and an inverter or to interconnect the inverter and a motor. The grommet is mounted around a through-hole in a floor panel. The grommet comprises two members in which a grommet main body made of a rubber or an elastomer and a resin inner made of a resin product are incorporated with each other.

Preferably, the grommet main body includes the first diameter tubular section that is closely mounted on the pipe harness, the turning portion provided on the distal end of the first diameter tubular section, the outer tubular section, and the second diameter tubular section. The second diameter tubular section includes a peripheral wall provided with a latch portion for receiving and engaging the resin inner. The resin inner includes the vehicle body latch portion comprising a flange that is inserted into and engaged with the latch portion, an annular frame that protrudes from an inner peripheral edge of the flange, and a plurality of locking pawls spaced apart from one another in a peripheral direction of the annular frame and adapted to be secured to the through-hole. The other end of the first diameter tubular section of the grommet main body protrudes from the distal end of the annular frame of the resin inner. A band-winding portion is provided on an outer periphery of the projecting distal end.

Furthermore, an end of the first diameter tubular section, on which the turning portion is provided, may define an assembled first diameter tubular section. A plurality of first diameter tubular branched elements may be divided from the assembled first diameter tubular section in accordance with the number of the pipe harnesses to be inserted into the assembled first diameter tubular section.

In addition, the first diameter tubular section may be slant connected to the closed end in accordance with an arranging direction of the pipe harness.

It should be noted that the grommet is not limited to the above configurations. The grommet may include only the grommet main body made of a rubber or the like and the outer peripheral surface of the second diameter tubular section of the grommet main body may be provided with an annular vehicle body recess.

According to the disclosed grommet, since the outer tubular section is provided through the turning portion on the end of the first diameter tubular section that passes the wire harness in a close contact manner, and the turning portion and outer tubular section are under the movable free condition, it is possible to displace the turning portion toward the inner tubular side so that the first diameter tubular section can be extended and it is possible to start extending the turning portion. This will be preferable if an amount of expansion is a little. In particular, if the turning portion is provided with a thin portion, it is possible to displace the turning portion and outer tubular section toward the inner tubular side without causing any resistance. Thus, the first diameter tubular section can be smoothly extended.

BRIEF DESCRIPTION OF THE DRAWINGS

FIG. 8 is a schematic section view of a main part of the first diameter tubular section of the grommet in a third embodiment.

FIGS. 9A to 9E are section views of a prior art grommet, illustrating actions of the grommet.

DETAILED DESCRIPTION OF EMBODIMENTS

Figure 1:
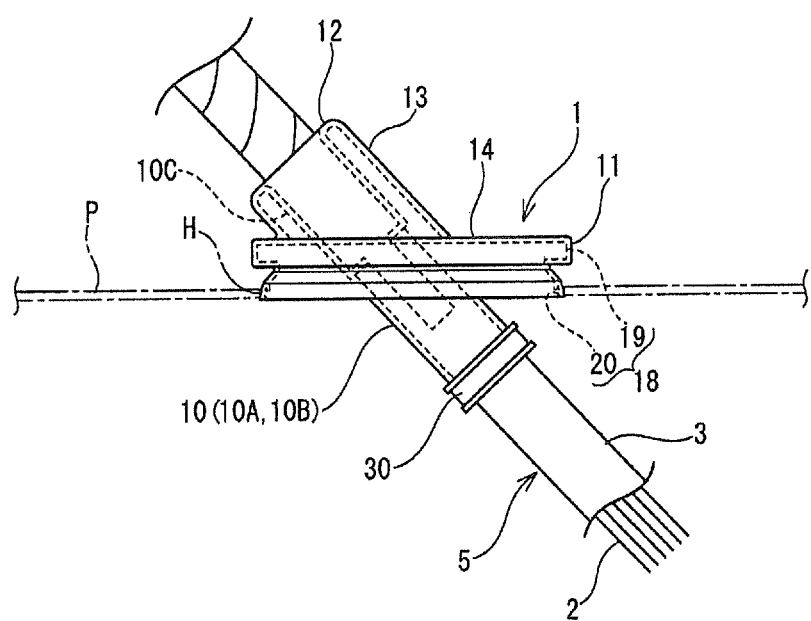
FIG. 1 is a front elevation view of a grommet of a first embodiment, illustrating the grommet into which a wire harness is inserted and which is mounted on a vehicle body panel.

Referring now to the drawings, exemplary embodiments of a grommet will be described below.

FIG. 1 to FIG. 5C show a first embodiment of the grommet.

A grommet 1 is used for a pipe harness 5 made of an aluminium based metal pipe 3 in which a plurality of electrical wires 2 are inserted. The electrical wires 2 serve to interconnect a battery for a hybrid motor vehicle or an electric motor vehicle and an inverter or to interconnect the inverter and a motor. The grommet 1 is mounted around a through-hole H in a floor panel P.

Figure 2A:
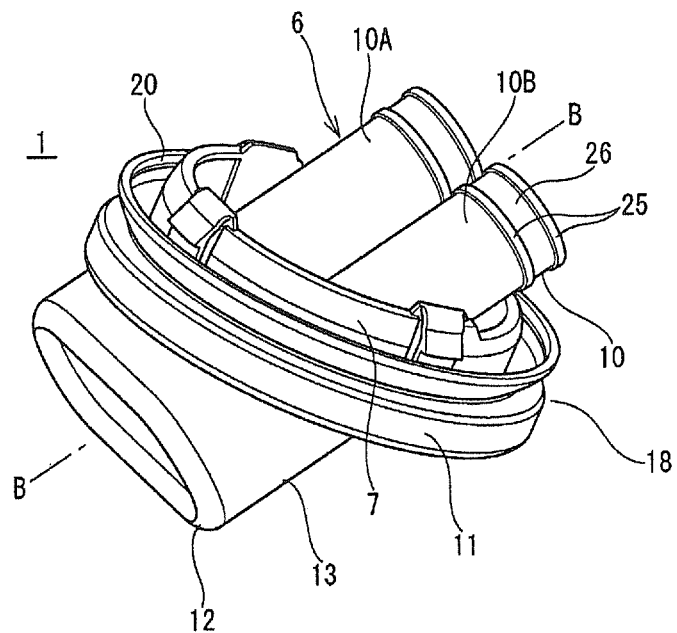
FIG. 2A is a perspective view of the grommet shown in FIG. 1.
Figure 2B:
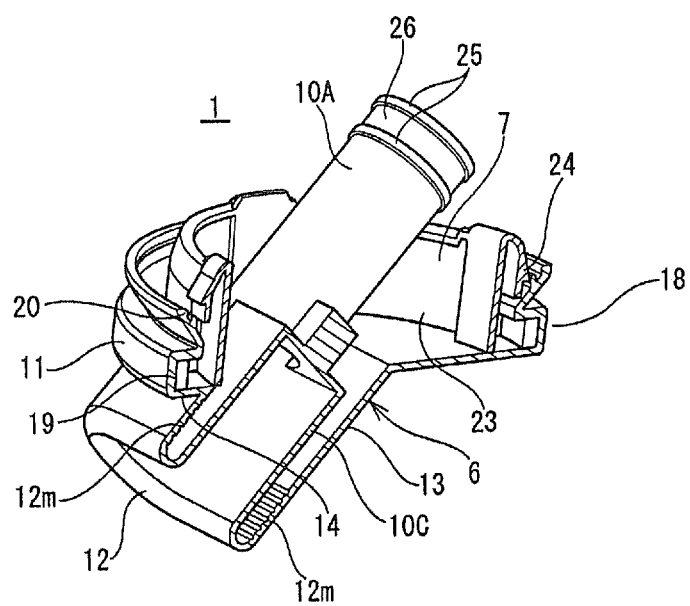
FIG. 2B is a perspective section view taken along lines B-B in FIG. 2A.
Figure 3A:
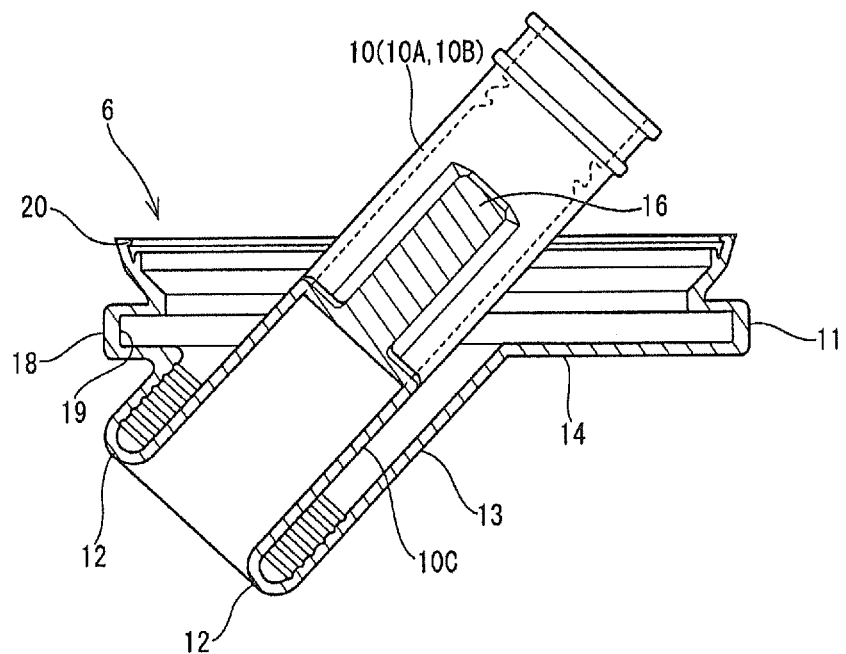
FIG. 3A is a section view of a grommet main body of the grommet shown in FIG. 1.
Figure 3B:
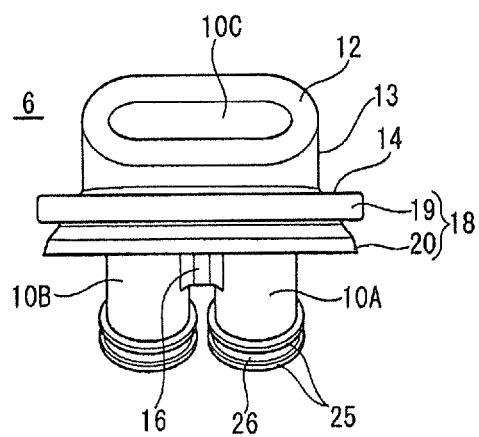
FIG. 3B is a perspective view of the grommet main body taken from a bottom side.
Figure 3C:
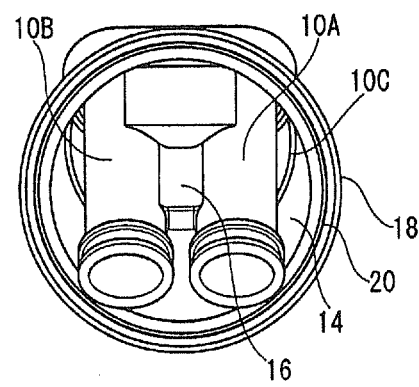
FIG. 3C is a perspective view of the grommet main body taken from a top side.

As shown in FIGS. 2A and 2B, the grommet 1 comprises two members, that is, a grommet main body 6 made of a rubber or an elastomer and a resin inner made of a resin product are incorporated with each other to constitute the grommet 1.

The grommet main body 6 includes a first diameter tubular section 10 that serves to pass a pipe harness in a close contact manner and a second diameter tubular section 11 that protrudes from an intermediate part of the first diameter tubular section 10 in its longitudinal direction and is adapted to be attached to the through-hole H in the floor panel P.

The first diameter tubular section 10 is provided in an axial direction with a turning portion 12 that turns toward an outer periphery. An outer tubular section 13 is connected to the turning portion 12. A closed end 14 of the second diameter tubular section 11 is connected to the other end of the outer tubular section 13. The first diameter tubular section 10 that defines an inner tubular section with respect to the outer tubular section 13 is divided into two branched first diameter tubular section elements 10A and 10B that protrude from the interior of the closed end 14 and that are parallel to each other at the other end of the first diameter tubular section 10. An inner diameter of each of the branched first diameter tubular section elements 10A and 10B is set to be a size that adds a tolerance in dimension to an outer diameter of the pipe 3 of the pipe harness 5. The branched first diameter tubular section elements 10A and 10B are closely contacted with the pipe 3 by a sealing manner. Thus, the first diameter tubular section 10 forms an assembled first diameter tubular section 10C incorporated with the two branched first diameter tubular section elements 10A and 10B at the side protruding from the closed end 14. The assembled first diameter tubular section 10C turns at its distal end to form the turning portion 12 and is connected through the turning portion 12 to the outer tubular section 13 so that the outer tubular section 13 is connected to the second diameter tubular section 11.

As shown by an enlarged scale in FIG. 3A and FIGS. 5A to 5C, the turning portion 12 of the first diameter tubular section 10 is formed into a U-shaped configuration. The assembled first diameter tubular section 10C and outer tubular section 13 are connected to each other through a curved portion of the turning portion 12. The turning portion 12 is provided on its inner surface of an outer side part with a plurality of grooves 12m that extend in parallel in a width direction of the groove by decreasing a thickness of the turning portion 12.

Figure 6A:
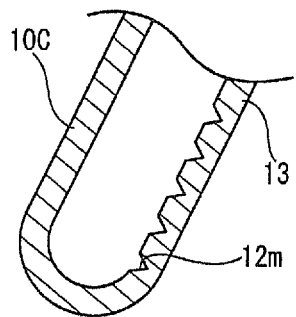
FIGS. 6A and 6B are section views of the first diameter tubular section of the grommet in alterations of the first embodiment.
Figure 6B:
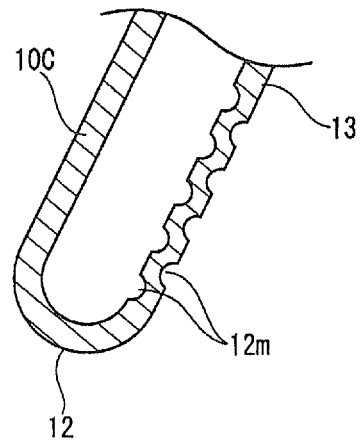

As shown in FIG. 6A, each groove 12m that decreases the thickness of the turning portion 12 may be formed into a V-shape in cross section. Also, as shown in FIG. 6B, the grooves 12m may be formed alternately in the inner and outer surfaces of the turning portion 12.

The first diameter tubular section 10 intersects the closed end 14 not perpendicularly but slant. A coupling portion 16 having a great thickness is provided between the two branched first diameter tubular section elements 10A and 10B so as to hold the branched first diameter tubular section elements 10A and 10B in a desired slant angle.

The second diameter tubular section 11 is provided with a peripheral wall 18 that extends from an outer peripheral edge of the closed end 14. The peripheral wall 18 is provided with an annular latch portion 19 that has a recess for receiving and holding the resin inner 7 and with a sealing lip 20 that extends outward from an distal end of the annular latch portion 19.

Figure 4A:
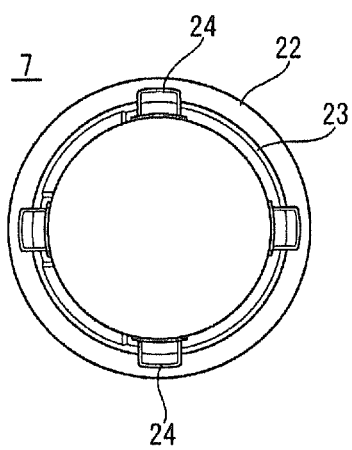
FIG. 4A is a plan view of a resin inner of the grommet shown in FIG. 1.
Figure 4B:
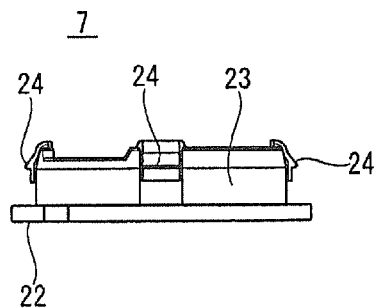
FIG. 4B is a front elevation view of the resin inner.

As shown in FIGS. 4A and 4B, the resin inner 7 includes a flange 22 to be inserted into and engaged with the annular latch portion 19, an annular frame 23 that protrudes from an inner peripheral edge of the flange 22, and a plurality of locking pawls 24 that serve to be fixed in the through-hole and are spaced from one another by an angle of 90 degrees in a peripheral direction of the annular frame 23.

The branched first diameter tubular section elements 10A and 10B of the first diameter tubular section 10 extend from the inside of the annular frame 23 of the resin inner 7. The branched first diameter tubular section elements 10A and 10B are provided on their outer peripheries at the distal end sides with a pair of annular ribs 25 (see FIG. 2A), respectively. A band-winding portion 26 (see FIG. 2A) is provided between the annular ribs 25.

Thus, the turning portion 12 is provided on the assembled first diameter tubular section 10C that defines a grommet-pushing side end. The turning portion 12 is not secured to the pipe harness by a tape or a band while a binding band 30 bundles the pipe harness 5 and first diameter tubular section 10 at a grommet-inserting side end of the branched first diameter tubular section elements 10A and 10B that define the opposite distal end.

After the grommet 1 is attached to the two pipe harnesses 5 beforehand so that the two pipe harnesses 5 are inserted into the branched first diameter tubular section elements 10A and 10B of the grommet 1, respectively, the two pipe harnesses 5 are pulled out from the assembled first diameter tubular section 10C. The two pipe harnesses 5 are secured to exit sides of the branched first diameter tubular section elements 10A and 10B by the binding bands 30, respectively.

Thus, when the pipe harnesses 5, on which the grommet 1 are mounted, are arranged on a motor vehicle, the pipe harnesses 5 are disposed on a lower part of the floor panel P and the grommet 1 is pushed downward into the through-hole H in the floor panel P.

In more detail, the branched first diameter tubular section elements 10A and 10B, in which the pipe harnesses 5 are inserted, are slant inserted into the through-hole H, the center of the resin inner 7 is accorded with the center of the through-hole H, and the locking pawls 24 are engaged with an edge around the through-hole H. When an engaging work is carried out, while a working person is holding a wire harness drawn out from the assembled first diameter tubular section 10C, the person must push the grommet 1 into the through-hole H by a relatively great force.

Figure 5A:
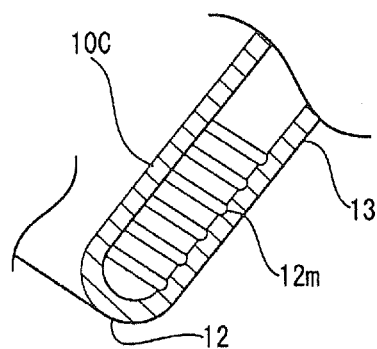
FIG. 5A is an enlarged section view of a main part of a first diameter tubular section of the grommet shown in FIG. 2B.
Figure 5B:
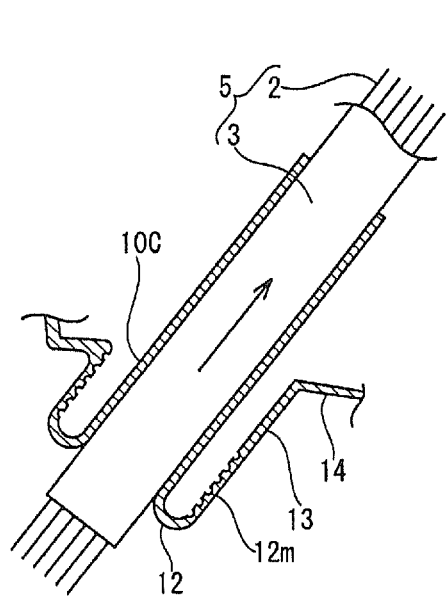
FIGS. 5B and 5C are explanatory views illustrating an action of the first diameter tubular section.
Figure 5C:
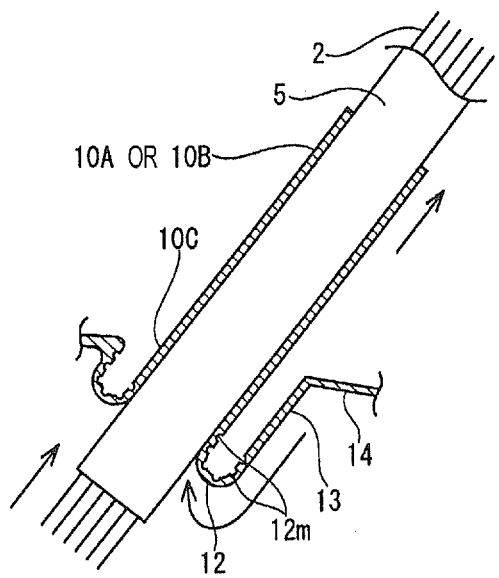

Since the outer peripheral surface of each pipe 3 closely contacts with each of the branched first diameter tubular section elements 10A and 10B when the pipe harness 5 is pushed into the branched element 10A and 10B, as shown in FIG. 5B, the branched first diameter tubular section elements 10A and 10B are pulled outward in an extending direction as the pipes 3 are being inserted into the branched elements 10A and 10B. When the pulling force is applied to the grommet 1, the turning portion 12 is pulled to the assembled first diameter tubular section 10C so that the turning portion 12 becomes the inner tube. As shown in FIG. 5B, the outer tubular section 13 moves toward the assembled first diameter tubular section 10C through the turning portion 12 by the pulling force, so that the first diameter tubular section 10C, which becomes the inner tube, is extended. Since the turning portion 12 is provided with the grooves 12m, it is possible for a light force to move the turning portion 12 and outer tubular section 13 toward the assembled first diameter tubular section 10C at the inner tube side. Consequently, it is possible to reduce an inserting and engaging force of the grommet 1 into and with the through-hole H in the vehicle body panel P and to relieve a load for a working person.

Also, when the pushing force is released after the locking pawls 24 are engaged with the edge around the through-hole H, the turning portion 12 and outer tubular section 13 return to their original positions automatically.

Thus, since the grommet 1 is automatically extended by a pushing action of the grommet 1 into the through-hole H and the grommet 1 returns automatically to the original position after the grommet 1 is engaged with the through-hole H, it is not necessary to add a particular operation to the grommet and it is possible to provide the grommet having good workability. Since an elongation of the disclosed grommet is small and the grooves 12m are provided in the turning portion 12, which is a start point of elongation although the grommet is difficult in elongation under an usual condition, to define thin thickness parts, a resistance against elongation at a starting time becomes low and thus a light force can elongate the grommet.

Figure 7:
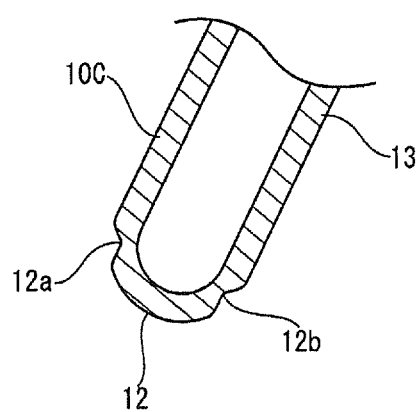
FIG. 7 is a section view of a main part of the first diameter tubular section of the grommet in a second embodiment.

FIG. 7 shows a second embodiment of the grommet.

In the second embodiment of the grommet, the turning portion 12 is provided on its inner and outer bending parts with thin portions 12a and 12b so that the turning portion 12 can be deformed flexibly and the outer tubular section 13 can be displaced readily toward the inner assembled first diameter tubular section 10C.

As described above, the thin portions 12a and 12b serve to displace the turning portion 12 and outer tubular section 13 inward in response to the pushing force, as is the case with the first embodiment, and it is possible to extend the first diameter tubular section 10 by a light force.

FIG. 8 shows a third embodiment of the grommet.

In the third embodiment of the grommet, the turning portion 12 is provided on its U-shaped bottom with a smaller curved portion 12r and on an outer side with a slant outer side portion 12s that is inclined inward, in lieu of providing the turning portion with a thin portion. The outer side portion 12s can be readily moved toward the inner assembled first diameter tubular section 10C.

Thus, even if the turning portion 12 is provided with not the thin portion but an angled portion, it is possible for a light force to extend the first diameter tubular section and to relieve a load for a working person.

It should be noted that the disclosed grommet is not limited to the above embodiments. The grommet may be formed into a single product made of a rubber or an elastomer. The vehicle body latch portion may be changed to a second diameter tubular section of which an outer peripheral surface is provided with an annular vehicle body latch recess.

The grommet may pass a single wire harness, the first diameter tubular section may be formed into a single continuous configuration without providing the first diameter tubular branched elements described above.

Furthermore, the wire harness to be inserted into the grommet is not limited to the pipe harness. The disclosed grommet can also pass wire harnesses bundled by tape.

What is claimed is:

1. A grommet for a wire harness for inserting into a through-hole of a vehicle body panel comprising:
    a first diameter tubular section being provided in an axial direction and having:
        an inner portion wherein the wire harness passes through the first diameter tubular section closely,
        a first end defining a grommet-pushing side that has a turning portion that is bent outwardly,
        an outer tubular section that extends in the axial direction, the outer tubular section having a projecting end,
        a second end opposing the first end, defining a grommet-inserting side, and
        an intermediate part that is between the first end and the second end in a longitudinal direction; and
    a second diameter tubular section that is larger than the first diameter tubular section and provided on the intermediate part of the first diameter tubular section, in a longitudinal direction, the second diameter tubular section having:
        a closed end that is connected to the projecting end of the outer tubular section,
        an outer periphery; and
        a vehicle body latch portion that is provided on the outer periphery of the second diameter tubular section,
    wherein the wire harness is not secured to the turning portion of the first diameter tubular section with a tape or a band on the first end and the wire harness is secured to the turning portion of the first diameter tubular section on the second end, and
    the turning portion is deformed inwardly in response to inserting the grommet into the through-hole in the vehicle body panel resulting in the first diameter tubular section being elongated.

2. A grommet according to claim 1, the turning portion comprising an inner side portion and an outer side portion that has an inner surface, wherein the turning portion interconnects the first end of the first diameter tubular section and the outer tubular section to form a U-shaped configuration in cross section and a bent portion between a bottom portion of the U-shaped configuration, and the outer side portion has a thickness that allows the turning portion to readily deform inwardly, and
    the U-shaped configuration is provided on the outer side portion or an inner surface of the outer side portion with grooves extending in a width direction of the U-shaped configuration so that the outer side portion can readily move toward the inner side portion.

3. A grommet according to claim 1, wherein the wire harness that passes the first diameter tubular section of the grommet includes:
    a pipe harness, and
    a metal pipe, the pipe harness being inserted into the metal pipe, and the metal pipe being inserted into the first diameter tubular section closely.

4. A grommet according to claim 3,
    wherein the grommet is configured to engage with a pipe harness in which a plurality of electrical wires are inserted into the metal pipe and the electrical wires serve to interconnect a battery for a hybrid motor vehicle or an electric motor vehicle and an inverter or to interconnect the inverter and a motor, and the grommet is mounted around a through-hole in a floor panel;

wherein the grommet further comprises:

a grommet main body made of a rubber or an elastomer and includes the first diameter tubular section, the turning portion, the outer tubular section, and the second diameter tubular section which further includes a second latch portion; and a resin inner made of a resin product and includes the vehicle body latch portion which comprises:

a flange that has an inner peripheral edge and engages with the second latch portion, an annular frame that protrudes from the inner peripheral edge of the flange, and a plurality of locking pawls spaced apart from one another along the inner peripheral edge of the annular frame and adapted to be secured to the through-hole;

wherein the second end of the first diameter tubular section of the grommet main body protrudes from the first end of the annular frame of the resin inner, and a band-winding portion is provided on an outer periphery of the second end.

5. A grommet according to claim 1, wherein an end of the first diameter tubular section, on which the turning portion is provided, defines an assembled first diameter tubular section, a plurality of first diameter tubular branched elements are divided from the assembled first diameter tubular section in accordance with the number of the pipe harnesses to be inserted into the assembled first diameter tubular section.

6. A grommet according to claim 1, the turning portion comprising an inner side portion and outer side portion that has an inner surface, wherein the turning portion interconnects the first end of the first diameter tubular section and the outer tubular section to form a U-shaped configuration in a cross sectional view, the U-shaped configuration being provided on the outer side portion and an inner surface of an outer side portion with grooves extending in a width direction of the U-shaped configuration so that the outer side portion can readily move toward the inner side portion.

7. A grommet according to claim 1, wherein the turning portion interconnects the first end of the first diameter tubular section and the outer tubular section to form a U-shaped configuration in a cross sectional view, a bent portion between a bottom portion of the U-shaped configuration and an outer side portion has a thickness that allows the turning portion can readily deform inwardly, and the bottom portion of the U-shaped configuration is formed into a small curved portion and the outer side portion is slanted inward so that the outer side portion can readily move toward the inner side portion.

8. A grommet for a wire harness for inserting into a through-hole of a vehicle body panel comprising:

a first diameter tubular section being provided in an axial direction and having:

an inner portion wherein the wire harness passes through the first diameter tubular section closely, a first end defining a grommet-pushing side that has a turning portion that is bent outwardly, an outer tubular section that extends in the axial direction, the outer tubular section having a projecting end, an intermediate part that is between the first end and the second end in a longitudinal direction, and a second end opposing the first end, defining a grommet-inserting side; and a second diameter tubular section provided on the intermediate part of the first diameter tubular section, the second diameter tubular section having:

a closed end that is connected to the projecting end of the outer tubular section, an outer periphery, and a vehicle body latch portion; and a resin inner that is incorporated with the second diameter tubular section, the vehicle body latch portion being provided on the resin inner, wherein the wire harness is secured to the turning portion of the first diameter tubular section on the second end, and the grommet is inserted into the through-hole in the vehicle body panel resulting in the first diameter tubular section being elongated.

9. The grommet of claim 8, the turning portion having a narrow portion that is narrower than the outer tubular section.

10. The grommet of claim 8, the turning portion having grooves that are curved and extend in a width direction of the outer tubular section.

11. The grommet of claim 8, the turning portion having grooves that are angular and extend in a width direction of the outer tubular section.

* * * * *